(12) United States Patent
Huetsch et al.

(10) Patent No.: US 7,500,243 B2
(45) Date of Patent: Mar. 3, 2009

(54) LOAD BALANCING METHOD AND SYSTEM USING MULTIPLE LOAD BALANCING SERVERS

(75) Inventors: Matthias Huetsch, Hamburg (DE); Markus Meyer, Winsen (DE); Markus Herzog, Hamburg (DE); Oliver Braun, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 380 days.

(21) Appl. No.: 09/932,717

(22) Filed: Aug. 17, 2001

(65) Prior Publication Data

US 2002/0049842 A1    Apr. 25, 2002

Related U.S. Application Data

(60) Provisional application No. 60/279,557, filed on Mar. 28, 2001.

(30) Foreign Application Priority Data

Aug. 17, 2000  (EP) .................................. 00117722

(51) Int. Cl.
*G06F 9/46* (2006.01)
*G06F 15/16* (2006.01)

(52) U.S. Cl. ...................................... 718/105; 709/203

(58) Field of Classification Search ................ 718/105, 718/104; 709/201–203, 208, 217, 223, 226; 370/238

See application file for complete search history.

(56) References Cited

U.S. PATENT DOCUMENTS

| 5,341,477 | A | * | 8/1994 | Pitkin et al. ................. 709/226 |
| 5,774,660 | A | | 6/1998 | Zaide et al. |
| 6,249,801 | B1 | * | 6/2001 | Zisapel et al. ................ 718/105 |
| 6,473,791 | B1 | * | 10/2002 | Al-Ghosein et al. ......... 709/217 |
| 6,598,067 | B1 | * | 7/2003 | Wydra et al. ................. 718/100 |
| 6,665,702 | B1 | * | 12/2003 | Zisapel et al. ................ 718/105 |
| 6,671,259 | B1 | * | 12/2003 | He et al. ...................... 370/238 |

(Continued)

OTHER PUBLICATIONS

Hunt, G. D. H. et al., "Network Dispatcher: A Connection Router For Scalable Internet Services", Computer Networks and ISBN Systems, North Holland Publishing. Amsterdam, NL, vol. 30, No. 1-7, Apr. 1, 1998, pp. 347-357.

(Continued)

*Primary Examiner*—Meng-Ai An
*Assistant Examiner*—Qing-Yuan Wu
(74) *Attorney, Agent, or Firm*—Sonnenschein, Nath & Rosenthal LLP

(57) ABSTRACT

Load balancing method and system for balancing a processing load in a network, wherein load balancer upon receiving a client request selects one of a plurality of processing servers for serving the request. The selection of a processing server may be based on a location of a client and a processing server. The load balancer may comprise a load balancing master and a plurality of load balancing slaves, wherein the load balancing slaves receive client requests and transmit a selection request message to the load balancing master. The load balancing master selects a load balancing slave and/or a processing server for serving the request and generates a corresponding instruction message. The client request is served by the selected load balancing slave and the selected processing server by establishing a communication link between the client and the processing server. Service may involve execution of applications on the selected processing server under control of the client, for example word processors, scientific applications and similar.

21 Claims, 7 Drawing Sheets

U.S. PATENT DOCUMENTS

| | | | |
|---|---|---|---|
| 6,718,359 B2 * | 4/2004 | Zisapel et al. | 718/238 |
| 6,725,253 B1 * | 4/2004 | Okano et al. | 709/203 |
| 6,912,588 B1 * | 6/2005 | Jardin et al. | 709/238 |
| 6,987,763 B2 * | 1/2006 | Rochberger et al. | 370/389 |

OTHER PUBLICATIONS

Starportal™ Early Access II, Architecture, Concepts and Technologies, Sun Microsystems, Inc., Aug. 2000, Revision B.

* cited by examiner

US 7,500,243 B2

1

LOAD BALANCING METHOD AND SYSTEM USING MULTIPLE LOAD BALANCING SERVERS

CROSS-REFERNECE TO RELATED APPLICATIONS

The following identifies U.S. and foreign patent applications that are relied upon and are incorporated by reference in this application:

European Patent Application No. 00117722.9, entitled "LOAD BALANCING METHOD AND SYSTEM", filed on Aug. 17, 2000; and U.S. Provisional Patent Application No. 60/279,557, entitled "LOAD BALANCING METHOD AND SYSTEM", filed on Mar. 28, 2001.

FIELD OF THE INVENTION

The invention relates to a method and system for balancing a processing load in a network.

BACKGROUND OF THE INVENTION

In today's computerized world, an increasing number of tasks are solved using networks of computers. In these cases, a user operating a computer connected to a network of computers such as the Internet, is able to access data stored on an arbitrary computer that is also connected to the network. A user may, for example, retrieve information from another computer connected to the network located at an arbitrary location or may retrieve an application program for execution. The user may also wish to send data stored on his computer to another computer at some other location in the network.

In a scenario where a large number of computers are connected in a network, it is conceivable that applications for storing, generating, processing and manipulating data, visualization, or similar activities are not locally executed on a client data processing device, but are executed on another computer that is connected to the network, wherein the execution of this application may be controlled through the client computer. For example, in Internet mail applications (e-mail), a user may access his mailbox through a client computer by logging on to a server hosting the user mailbox. After logging on to the server, the user can browse through e-mail messages, store and manipulate e-mail messages or send e-mail messages. In this case, the user's computer, i.e. client computer, generates and transmits instructions to the server which thereupon performs the desired operation. Thus, the e-mail application is executed at the server, while instructions controlling the application are generated at the client computer and screen contents are transmitted from the server to the client computer for local display.

In general, any application may be executed in the described way, i.e. remote from a client computer on a server computer. A server usually is a data processing device having large capacity for serving a number of client requests regarding the execution of applications for the users. However, in the case of a large number of client computers that desire to remotely run an application on a server, the capacity for serving client requests can become insufficient and lead to poor performance and high latency for users. Requests from clients may be evenly distributed over a given number of servers in order to distribute the processing load, however, this also has unsatisfactory results of poor performance and high latency.

2

Therefore, there is a need to improve over conventional systems.

SUMMARY OF THE INVENTION

Methods, systems, and articles of manufacture consistent with the present invention overcome the short comings of the prior art by balancing a processing load in a network among a plurality of servers. The approach is for balancing the processing load in a network having a plurality of servers and a load balancer and includes receiving a client request at the load balancer from a client, selecting at the load balancer one of the plurality of processing servers for serving the client request, establishing a communication link between the client and the selected processing server, and authorizing the selected processing server to serve the client request, e.g., by launching an application and receiving instructions from the client. This approach provides an advantage that requests from a large number of clients may be distributed over a number of processing server under control of the load balancer.

In accordance with methods consistent with the present invention, a method is provided for balancing a load in a network having a plurality of processing servers and a client. The method comprising the steps of receiving at the load balancing slave a request from the client to perform processing, sending by the load balancing slave the request to the load balancing master in response to the receipt of the request, determining a load of each of the plurality of servers by the load balancing master, selecting by the load balancing master a selected one of the plurality of servers that is suitable for performing the processing, wherein the selected server is selected based on the load of each of the plurality of servers, sending an identifier of the selected server from the load balancing master to the load balancing slave, and establishing by the load balancing slave a communication link between the selected server and the client to perform the processing. In accordance with methods consistent with the present invention, a method is provided for balancing load at a load balancing master. The method comprising the steps of receiving by the first load balancing server a request to perform processing, sending the request from the first load balancing server to the second load balancing server, determining a load of each of the processing servers by the second load balancing server, selecting by the second load balancing server a selected one of the plurality of processing servers that is suitable for performing the processing, wherein the selection is performed based on the load of each of the plurality of processing servers, and sending by the second load balancing server to the selected processing server an indication to perform the processing.

In accordance with articles of manufacture consistent with the present invention, a computer-readable medium is provided. The computer-readable medium containing instructions that cause a data processing system to perform a method for balancing a load in a network having a load balancing slave, a load balancing master, a plurality of servers, and a client. The method comprising the steps of receiving at the load balancing slave a request from the client to perform processing, sending by the load balancing slave the request to the load balancing master in response to the receipt of the request determining a load of each of the plurality of servers by the load balancing master, selecting by the load balancing master a selected one of the plurality of servers that is suitable for performing the processing, wherein the selected server is selected based on the load of each of the plurality of servers, sending an identifier of the selected server from the load balancing master to the load balancing slave, and establishing by the load balancing slave a communication link between the selected server and the client to perform the processing.

In accordance with articles of manufacture consistent with the present invention, a computer-readable medium is provided. The computer-readable medium containing instructions that cause a data processing system to perform a method for load balancing having a first and a second load balancing server and having a plurality of processing servers. The method comprising the steps of receiving by the first load balancing server a request to perform processing, sending the request from the first load balancing server to the second load balancing server, determining a load of each of the processing servers by the second load balancing server, selecting by the second load balancing server a selected one of the plurality of processing servers that is suitable for performing the processing, wherein the selection is performed based on the load of each of the plurality of processing servers, and sending by the second load balancing server to the selected processing server an indication to perform the processing.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE PREFERRED EMBODIMENTS

Reference will now be made in detail to implementations consistent with the present invention as illustrated in the accompanying drawings. Whenever possible, the same reference numbers will be used throughout the drawings and the following description to refer to the same or like parts.

Figure 1:
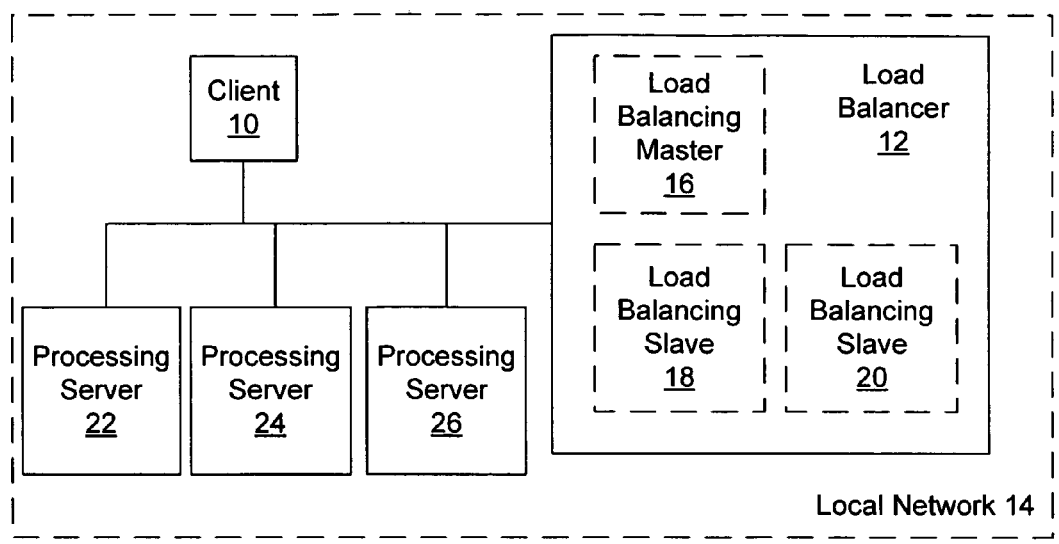
FIG. 1 depicts an illustration of a load balancer that balances the load caused by a client accessing processing servers in a local area network consistent with an implementation of the present invention.

In FIG. 1, an illustration of a load balancer 12 that balances the load caused by a client 10 accessing processing servers 22, 24, and 26 in a local area network 14 is shown. The client 10 is a device that is able to access the local area network 14, such as a personal computer, a terminal, personal digital assistant, or even a wireless device communicating with a base station, such as a cellular telephone or wireless Internet connection. The client 10 accesses data and applications that reside on the processing servers 22, 24 and 26 over local area network 14. The processing servers 22, 24 and 26 may be personal computers configured as data or application servers, Unix servers, or Window NT servers. The load balancer 12 is a server configured to select a processing server 22, 24, or 26 to process a client request from the client 10. The load balancer 12 may also be a dedicated device that is "hard coded" to function as a load balancer, rather than a server configured by software to execute a plurality of instructions to facilitate load balancing.

Load balancer 12 is illustrated in FIG. 1 as an individual server, but in alternate embodiments, multiple servers may be deployed. In a multiple server deployment, a load balancing master 16, directs a load balancing slave 18 and 20 to establish a connection between the client 10 and one of the processing servers 22, 24 or 26. The load balancing master 16 and load balancing slaves 18 and 20 may also be dedicated devices that are "hard coded" to function as a load balancer, rather than a server configured by software to execute a plurality of instructions to facilitate load balancing master 16 or load balancing slave 18, 20.

Figure 2:
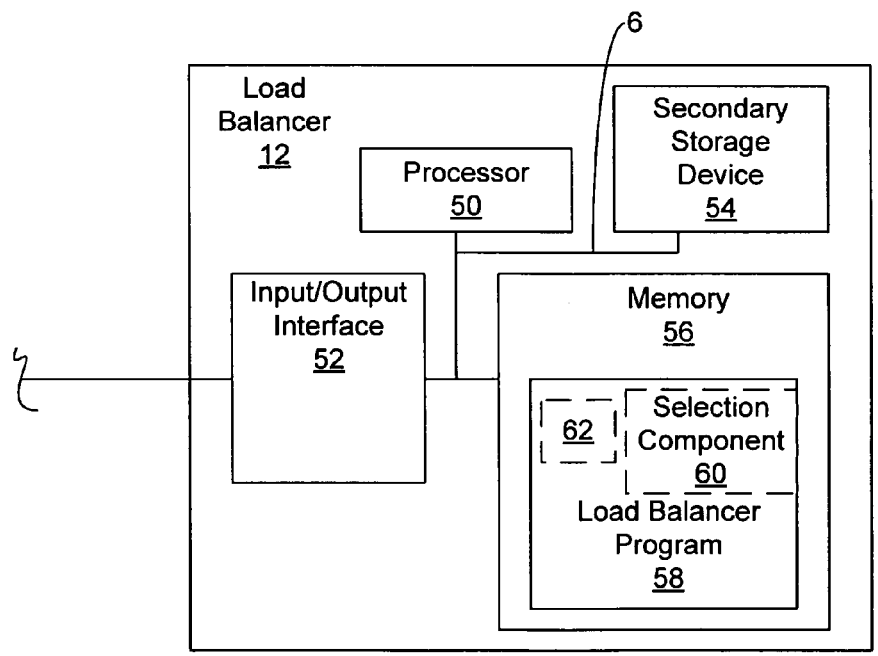
FIG. 2 depicts a block diagram of a server configured as a load balancer consistent with an implementation of the present invention.

Turning to FIG. 2, a block diagram of a server configured as a load balancer 12 is depicted. The load balancer 12 has a processor 50 in communication with a memory 56, input/output interface 52 and a secondary storage device 54, over at least one bus that is labeled 6. The processor 50 may be a microprocessor, application specific processor, embedded controller, or even digital logic acting a processor. The input/output interface 52 is the plurality of physical and lower level layers of protocols that enable communication with the local area network 14, such as a TCP/IP network, Serial communication interface, parallel communication interface, USB bus interface, keyboard interface, and video monitor interface.

The secondary storage device 54 is used by the load balancer 12 for semi-permanent and permanent storage of data and applications. Examples of such secondary storage devices are hard disk drives, floppy disk drives, optical disk drives (i.e. Compact Disks and Digital Video Disks). The memory 56 may be a combination of read only memory (ROM), flash memory, and random access memory (RAM, such as DRAMs, SDRAMS). A program is loaded from secondary storage device 54 into memory 56 by the processor 50 and is depicted as load balancer program 58. The load balancing program 58 has a selection component 60 and a message generator that encodes messages for transmission by the input/output interface 52. In some environments, the load balancer program 58 has a common memory space that contains the message generator 62 and selection program 60 as illustrated in FIG. 2. In other embodiments, the message generator 62 and selection program 60 may have their own memory space within memory 56.

Figure 3:
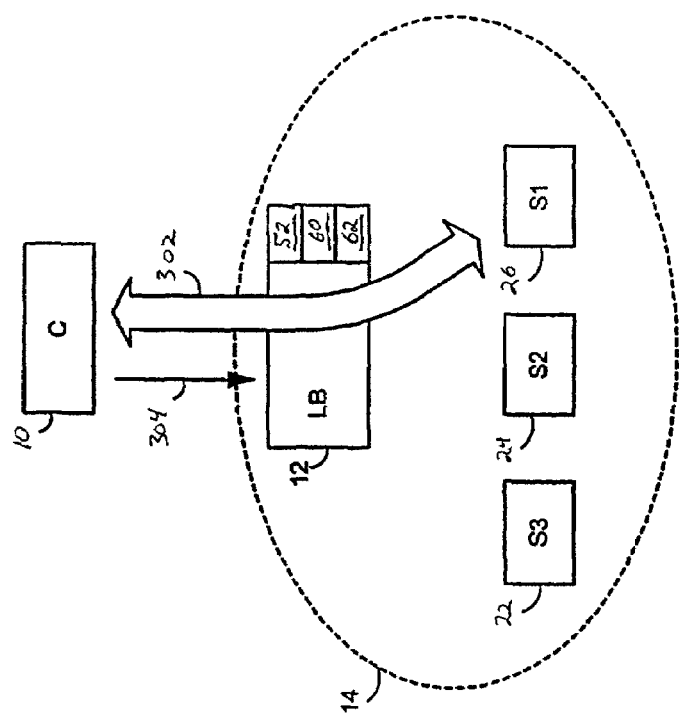
FIG. 3 depicts a block diagram illustrating a load balancing system consistent with an implementation of the present invention.

In FIG. 3, a block diagram illustrating a load balancing system is shown. The load balancing system has a client 10 and a load balancer 12 for balancing a processing load in a network, e.g. generated by requests from a plurality of clients. Furthermore, FIG. 3 has three processing servers 22, 24 and 26 for servicing client requests, such as client requests generated by the client 10. For simplicity reasons, FIG. 3 illustrates a single client 10 and three processing servers 22, 24 and 26. However, it is understood that an arbitrary number of clients and arbitrary number of processing servers may be present in a local area network.

The client 10 may be able to access the local area network 14 from a communication link, e.g. a communication link established through a public network such as the Internet, or any other network connection including wireless communication links. The communication link between the client 10 and the local area network 14 may also involve dedicated communication lines, such as a telephone line, ISDN or wireless communication links. However, it is possible for all or some entities of the system shown in FIG. 3 to be part of a wide area network or public network.

Further, the client 10 is enabled to access to a wide area network, such as the Internet and/or the local area network 14. For example, access to a wide area network or the local area network 14 may be gained by connecting the client 10 to a telephone line such as a dedicated line or wireless connection, and by dialing a telephone number of a network provider providing network services. In operation, the client 10 will generate a client request 304 concerning the execution of an application and/or the retrieval or transmission of data to and from a processing server, such as processing server 26. Further, a client request 304 generated by the client 10 may include a client identifier, for example a number string or character string uniquely identifying the client 10 and the client request may also include information on the location of the client 10.

The load balancer 12 is a data processing device having sufficient processing and memory capacity to handle a large number of client requests, e.g. a server. The load balancer 12 along with the processing servers 22, 24 and 26 may be part of local area network 14. The load balancer 12 receives client requests concerning the execution of applications and/or the retrieval or transmission of data between the client 10 and one of the processing servers 22, 24 or 26. The load balancer is provided with an input/output interface 52 for receiving client requests from the client 10. The input/output interface 52 is able to establish a link with the client 10 through a network and/or dedicated communication lines including wireless connections.

Further, the load balancer 12 may include a selection program 60 for selecting at least one of the processing servers 22, 24 or 26 a response to a client request. The selection program 60 communicates with the input/output interface 52 to obtain the client request or selected information contained in the client request from the input/output interface 52. Upon receiving a client request or information contained in a client request, the selection process 60 selects at least one of the processing servers 22, 24 and 26 for serving the request from client 10.

The selection program 60 maintains a list of available processing servers from which a processing server 22, 24 or 26 is selected from. The selection program 60 also maintains information about the locations of clients, the available processing servers and/or their relative processing load, e.g. a load generated by the serving of client requests. The individual processing load is reported from the processing servers 22, 24 and 26 from time to time to the selection program 60. In an alternative embodiment, the processing load is reported in regular time intervals to the selection program 60. Further, the selection program 60 may maintain a client request history, comprising an identity of requesting clients, requested program and processing servers previously selected for serving of previous client requests.

Upon receiving a request from a client 10 at the load balancer 12, the selection program 60 selects a processing server 22, 24 or 26 that is located closest to the client, e.g. in the same country, or a processing server which may be easily accessed by the client 10. The client identity identifies the client 10 and enables the client requests to be routed by the selection program 60 to a particular processing server that is already servicing a previous client request. Further, a processing server may be selected such that requests from the client 10 will be grouped onto the same processing server, i.e., all requests from a particular client 10, are served by a single processing server 26. The selection of a processing server 22, 24 or 26 may be performed by using a relative processing load to evenly distributed the processing load over the available processing servers 22, 24 and 26. Further, by using information about which programs are executing on selected processing servers and which clients are being serviced by the selected processing servers, client 10 requests from a particular client concerning the same program may be distributed to the same processing server 22, 24 or 26.

Thus, the selection of the processing server may be based on a client location in the network or relative to the processing server location, the processing server location in the network or relative to the client, the identity of a client, the load on a processing server, or an application request within a client request message. Further, the load balancer 12 may comprise a communication component allowing a communication link to be established between the client and the selected processing server through the load balancer 12. In FIG. 3, a communication link 302 is shown between client 10 and processing server 24. However, it is also possible to establish a direct communication link between the client 10 and processing server 24, i.e. a communication link which does not include the load balancer 12.

The message generator 62 communicates via the input/output interface and is in communication with the selection program 60 for obtaining information on the selected processing server 24. Further, the message generator 62 provides for contacting the selected processing server 22, 24, or 26, e.g. generating a request for service to be transmitted to the selected processing server. It is also possible that the input/output interface 52, the selection program 60 and the message generator 62 are constituted by code sections for execution on one or a plurality of data processing devices containing instructions for carrying out the processing steps in receiving client requests, selecting processing servers and establishing communication links between a client and a selected processing server.

Although aspects of one implementation are depicted as being stored in memory 58, one skilled in the art will appreciate that all or part of systems and methods consistent with the present invention may be stored on or read from other computer-readable media, such as secondary storage devices 54, or other forms of ROM or RAM either currently known or later developed. Further, although specific components of the data processing system are described, one skilled in the art will appreciate that a data processing system suitable for use with methods, systems, and articles of manufacture consistent with the invention may contain additional or different components.

Figure 4:
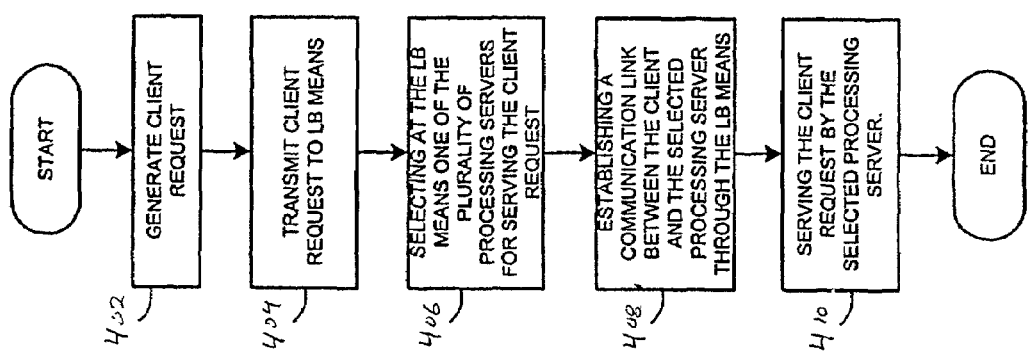
FIG. 4 depicts a flow diagram illustrating a flow of processing steps consistent with an implementation of the present invention.

In FIG. 4, a flow diagram illustrating the process steps for balancing a load involving the client 10, the load balancer 12, and one of the processing servers 22, 24 or 26 is shown. In step 402, the client 10 generates a client request. The client request is a request for service and may contain a request for execution of a program located on at least one of the processing server 22, 24, or 26. The requested program may be a word processing program, a spread sheet program, a mail program, a drawing program, scientific program, or other program that may be executed on a processing server and accessed by a client. The client request is generated at the client 10 to request access to a processing server 22, 24 or 26, e.g. by clicking on an icon on the desktop of a display device at the client or by entering corresponding commands into a command line. Thus, the client request may include a request for execution of a program and/or requested data and may optionally include information about client 10, such as client location and/or a client identifier.

In step 404, the client request is transmitted from the client 10 to the load balancer 12. The load balancer 12 receives the client request via the input/output interface 52, and in step 406, selects one of the plurality of processing servers 22, 24 or 26 for serving the client request. The selection of a processing server 22, 24 or 26 is accomplished by the load balancer 12 maintaining one or more metrics associated with each of the processing servers 22, 24 and 26, such as client location, a client identity, a processing server load, and an application request. When a selection occurs, the load balancer 12 compares one or more of the metrics associated with each processing server 22, 24, and 26 and selects an identifier that is associated with the optimal processing server. After selecting an appropriate processing server, for example processing server 26, the load balancer 12 establishes a communication link 302, step 408, between the client 10 and the processing server 26 through load balancer 12 (as illustrated by communication link 302 in FIG. 3).

The communication link 302 may be established via a network, dedicated communication links including wireless communication and similar. By establishing the communication link from the client 10 to the processing server 26 through the load balancer 12, communication from the client 10 regarding the client request will be relayed through the load balancer 12 to the processing server 26. Likewise, the information transmitted from the processing server 26 to the client 10 will be relayed by the load balancer 12. However, it is also possible in an alternate embodiment to establish a direct communication link between the client 10 and the selected processing server 26, i.e. a communication link which does not pass through the load balancer. In step 410, the selected processing server, e.g. processing server 26, services the client request. Even though FIG. 4 is described with respect to the client 10, it is understood that a request from any other client may be handled correspondingly.

A client request may involve receiving instructions from client 10 to launch a program at the selected processing server 26 and to control the program once launched. The client 10 may transmit instructions for starting a program at the selected processing server 26 and interactively control the program through further instructions transmitted from the client 10 to the processing server 26. An example of a program that may be requested by a client 10 is a text processor that the client 10 controls via instructions to the program running on processing server 26 to scrolling through a document. Such instructions results in the transmission of corresponding frame contents for local display at the client 10.

Figure 5:
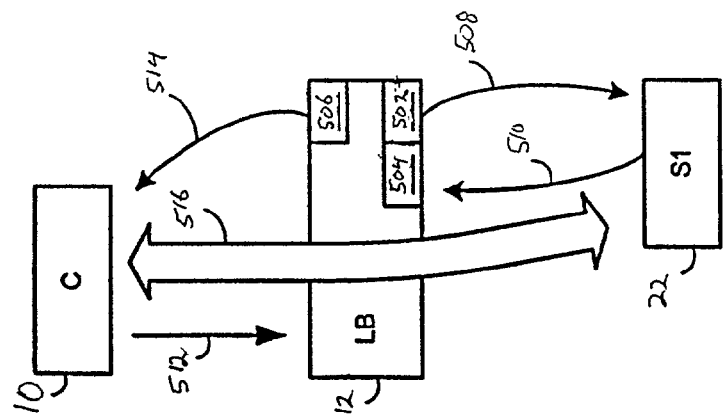
FIG. 5 depicts a block diagram illustrating a load balancing system consistent with an implementation of the present invention.

In FIG. 5, a block diagram illustrating a load balancing system is depicted. A load balancer 12 servicing a client request from a client 10 requesting assignment of a processing server 22 is illustrated. The embodiment of FIG. 5 is similar to the embodiment described with respect to FIG. 3, with the difference being that after selecting the processing server 22, the load balancer 12 and the selected processing server 22 exchange information.

Accordingly, the load balancer 12 receives a client request illustrated by the arrow 512 from the client 10. The load balancer 12 selects the processing server 22 for serving the received client request. Further, the client request includes an application identifier that enables the load balancer 12 to know which program is to be launched. The load balancer 12 then notifies the processing server 22 that has the requested program.

The message generator 502 in load balancer 12 generates an instruction message for instructing the selected processing server 22 to launch the program requested by the client 10. The instruction message is transmitted as illustrated by arrow 508 to the selected processing server 22. The instruction message may be directed to a daemon at the processing server 22 to instruct the daemon to launch the requested program. Further, the load balancer 12 may receive and store in memory 56 a process identifier 504 associated with the execution of the requested program from a process identification message. The process identifier 504 received from the processing server 22 specifies that the program has been launched at the processing server 22. The process identification message is illustrated by arrow 510 from the processing server 22 to the load balancer 12. The load balancer 12 may also have a message notification generator 506 that generates a notification message. The notification message 514 notifies a client 10 that the program has been started and has process identifier 504.

The embodiment described with respect to FIG. 5 provides an advantage of the load balancer 12 being able to launch the requested program immediately, i.e., before establishing the communication link, illustrated by double-arrow 516 between the client 10 and processing server 22. Thus, the client 10 may access the started program using the process identifier without an additional delay upon establishing the communication link between the client 10 and the processing server 22.

Figure 6:
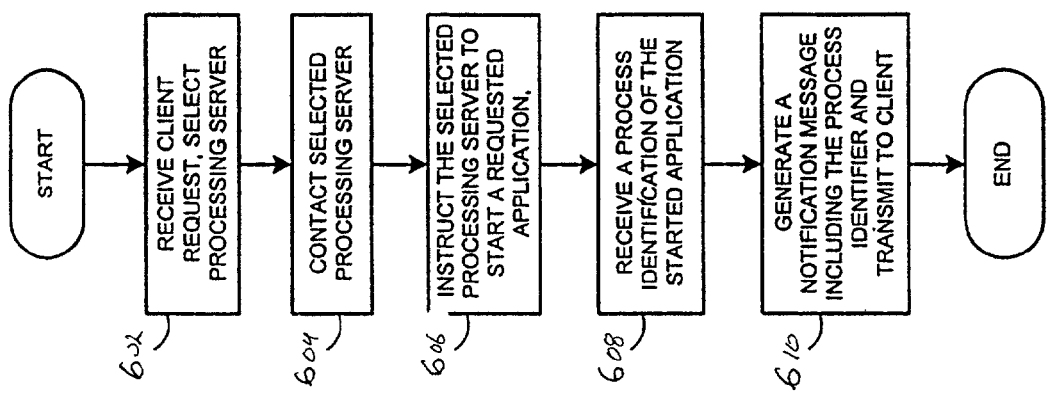
FIG. 6 depicts a flow diagram illustrating a sequence of steps performed at the load balancer consistent with an implementation of the present invention.

In FIG. 6, a flow diagram illustrating a sequence of processing steps performed at the load balancer 12 according to a further embodiment of the invention is shown. In step 602, the load balancer 12 receives a client request 512 from the client 10 and selects a processing server, e.g. processing server 22. The selection of a processing server 22 is accomplished by the load balancer 12 maintaining one or more metrics associated with each of the processing servers 22, 24 and 26, such as client location, a client identity, a processing server load, and an application request. When the selection occurs, the load balancer 12 compares one or more of the metrics associated with each processing server 22, 24, and 26 and selects the optimal processing server, i.e. processing server 22. Thereafter, in step 604, the load balancer 12 contacts the selected processing server 22 and instructs the selected processing server 22, in step 606, to start a program that was identified in the client request 512 from the client 10. This may be accomplished by contacting a daemon at the selected processing server 22 and instructing the daemon to launch the requested program, for example a word processing program, a mail program or similar program that executes on a server and is accessed by a client.

The selected processing server 22 will then launch the requested program. In step 608, the load balancer 12 receives a process identifier specifying the launched program from the selected processing server 22 or the daemon at the selected processing server 22, respectively. In step 610, the load balancer 12 generates a notification message that includes the process identifier and transmits the generated notification message to the client 10. The client 10 is then able to directly access the launched program at the selected processing server 22 upon establishment of a communication link 516 between the client 10 and the processing server 22. The described sequence of processing and notification steps particularly provides an advantage when establishing the communication link 516 between the client 10 and the selected processing server 22 requires a long time to establish, since before the communication link 516 is established the requested program is already launched at the processing server 22.

Figure 7:
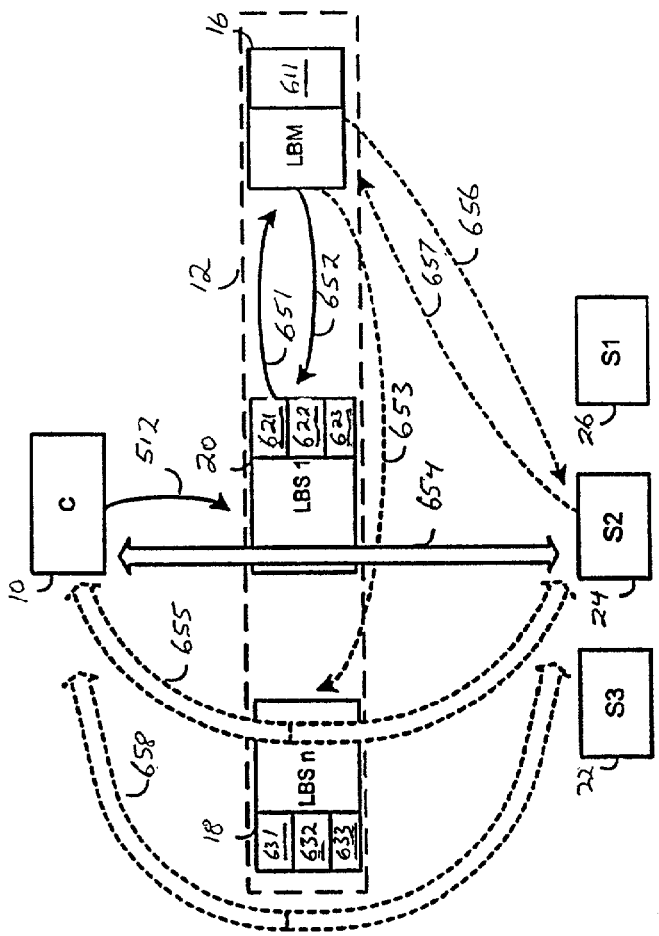
FIG. 7 depicts a load balancer having a load balancing master and two exemplary load balancing slaves that balance the load among three processing servers and at least one client consistent with an implementation of the present invention.

Turning to FIG. 7, a load balancer 12 having a load balancing master 16 and two exemplary load balancing slaves 18 and 20 that balance the load among three processing servers 22, 24, and 26 and at least one client 10 are illustrated. Even though two exemplary load balancing slaves are shown, it should be understood by one skilled in the art that an arbitrary number of load balancing slaves may be provided. The load balancing master 16 and the load balancing slaves 18 and 20 may be constituted by data processing devices, for example servers. The load balancing master 16 and the load balancing slaves 18 and 20 may be located at an arbitrary location in a network and may communicate with each other via communication links, e.g. using packet switched transmission, dedicated communication lines including wireless transmission or similar. The load balancer 12 is illustrated using a broken line in order to illustrate that the load balancer comprising the load balancing master 16 and the load balancing slaves 18 and 20 may be a distributed system of data processing devices.

The load balancing slave 18 (similarly 20) generally is responsible for receiving client requests and for communicating with the load balancing master 16 for selection of a processing server and/or alternate load balancing slave, such as load balancing server 18 for serving the client request from client 10. The load balancing slave 20 may comprise slave input/output interface 621 for receiving a client request from client 10, the request being transmitted from the client 10 to the load balancing slave 20 by an arrow denoted 512. The slave input/output interface 621 generally corresponds to the balancer input/output interface 52 outlined with respect to FIG. 2. Further, the load balancing slave 20 may comprise selection request message generator 622 to generate a selection request message and for transmitting the selection request message to the load balancing master 16.

The selection request message may include information from the client request such as an application request and/or data requested, client location, and client identity. Further, the selection request message may include information on the identity of the requesting load balancing slave, in the present case of load balancing slave 20, and may further comprise information on the location and/or processing load at the requesting load balancing slave 20. The transmission of the selection request message to the load balancing master 16 is illustrated by an arrow 651. Further, the load balancing slave 20 may comprise a slave communication program 623 for establishing a communication link between the client 10 and the selected processing server through the load balancing slave 20. The slave communication program 623 may be instructed by the load balancing master 16, as illustrated by an arrow 652, to establish communication link 654 between the client 10 and the selected processing server 24 through the load balancing slave 20. However, it is noted that it is also possible to establish a direct communication link 658 between the client 10 and processing server 24, i.e. a communication link which does not pass through the load balancing slave 20, in which case client 10 could be instructed to contact the selected processing server 24 in order to directly establish a communication link.

The structure of the load balancing slave 18 corresponds to the structure of the load balancing slave 20 and therefore, the load balancing slave 18 includes a slave input/output interface 631, a selection request message generator 632 and a slave communication program 633.

The load balancing master 16 is responsible for selecting one of the available processing servers 22, 24 or 26. Further, the load balancing master 16 may also be responsible for selecting another load balancing slave from the plurality of load balancing slaves 18 and 20. The load balancing master 16 receives a selection request message from the load balancing slave 20 as indicated by arrow 651. The load balancing master 16 analyzes the received selection request message in order to detect information about the request from the client 10, for example, a program being requested, data being requested, a client identity, a client location or similar information. Further, the load balancing master 16 may detect information on the load balancing slave 20 that may be included in the selection request message 651. If additional information is included, the load balancing master 16 may extract the information from the selection request message 651 regarding processing servers accessible from the requesting load balancing slave 20.

The selection component 611 on the load balancing master 16 selects one of a plurality of processing servers 22, 24, or 26 for serving the client request based on the information received from the load balancing slaves 18 and 20. The selection of the load balancing slave 18 or 20 at the load balancing master 16 may be based on a client location, a location of available load balancing slaves or a location of a processing server, as it may be desirable to select a load balancing slave in close proximity to the selected processing server and/or the requesting client. The selection of the load balancing slave at the load balancing master 16 may also be based on a comparison of the client location and a location of a load balancing slave and/or available processing servers, as it may be desirable to provide short communication paths between the client 10 and the selected processing server. Further, the selection of the load balancing slave may be based on a relative processing load at the load balancing slaves, client location, load balancing slave location, client identity, processing load at a load balancing slave, and the program requested within a client request message. Thus, the selection of the processing server and of the load balancing slave for serving the client request from client 10 may be optimized by grouping client request from a particular client for service by a specific processing server and/or load balancing slave, and may be optimized in view of processing load at processing servers and load balancing slaves, and may be optimized in view of short communication links between the client 10, the selected load balancing slave 18 and 20 and the selected processing server 22, 24, or 26. The load balancing being divided between load balancing master 16 and load balancing slaves, such as 18 and 20, allows for the scalability of load balancing through the addition of load balancing servers.

Further in FIG. 7, a client 10 transmitting a client request to the load balancing slave 20 is shown. The client request is transmitted to the load balancing slave 20 as indicated by arrow 512. This may be achieved by configuring the client 10 to transmit client requests to load balancing slave 20, or in an alternate embodiment on a case by case bases. Obviously, it is also possible that at client 10 the load balancing slave 20 is configured as a primary load balancing slave. Furthermore, it is also possible that the load balancing slaves 18 and 20, when load capacity is exceeded, will reject the client requests from client 10 and instruct the client 10 to redirect client 10 request to another load balancing slave.

It is assumed that in FIG. 7 the load balancing master 16 selects processing server 24 for serving the client request, and further, it is assumed that the load balancing master 16 selects load balancing slave 20 for establishing the communication link between the client 10 and the processing server 24, as indicated by a double-lined arrow 654. In this case, the load balancing slave 20 receives a selection instruction message from the load balancing master 16 as indicated by arrow 652. However, it is also possible that the load balancing master 16 selects the load balancing slave 18 for serving the client request from client 10, and in this case the load balancing slave 18 may receive a selection instruction message from the load balancing master 16, as indicated by dotted arrow 653. In this case the load balancing slave 18 establishes the communication link between the client 10 and the selected processing server 24, as indicated by a dotted double-arrow 655.

It is also possible that the load balancing master 16, after receiving and analyzing a selection request message from one of the load balancing slaves and after selecting one of the processing servers for serving the request, contacts the selected processing server 24 in order to instruct the selected processing server to launch a program requested in the client request from client 10. The load balancing master 16 may therefore generate and process server instructions for instructing the selected processing server to launch a program requested by the client. The selected processing server 24 may be instructed by a message as illustrated by arrow 656 and may return a process identifier to the load balancing master 16 as illustrated by an arrow 657.

The load balancer described with respect to FIG. 7 provides superior balancing of the processing load when serving client requests from a plurality of clients by providing a combination of a plurality of load balancing slaves 18, 20 and a load balancing master 16. The load balancing slaves 18 and 20 are responsible for receiving client requests, and for interrogating the load balancing master 16 that selects the processing server and/or load balancing slave for serving the request. As location information of the client 10, the load balancing slaves 18 and 20, the processing servers 22, 24, and 26, identifiers of clients, identifier of load balancing slaves, and processing servers may be provided enabling short communication paths to be maintained and requests from particular clients may also be grouped for service involving the same processing server and/or load balancing slave.

Figure 8:
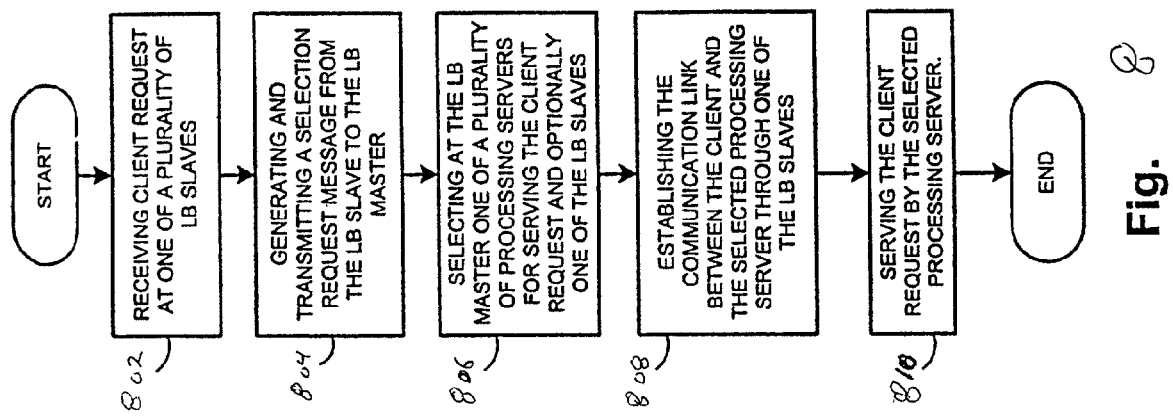
FIG. 8 depicts a flow diagram illustrating the process steps performed in a load balancing process having a load balancing master and a plurality of load balancing slaves consistent with an implementation of the present invention.

In FIG. 8 a flow diagram of the process steps performed in a load balancing process having a load balancing master 16 and a plurality of load balancing slaves 18 and 20 is shown. In step 802, a client request is received at one of a plurality of load balancing slaves 18 or 20. The load balancing slave may be pre-configured at the client 10 as primary load balancing slave or the client request may be redirected from another load balancing slave. In step 804, the load balancing slave 20 receiving the client request generates a selection request message 651, which it transmits to the load balancing master 16. The selection request message 651 may include information on the client request, the requesting client and the load balancing slave. After receiving the selection request message the load balancing master 16 in step 806 selects one of a plurality of processing servers 22, 24 or 26 for serving the client request. Optionally, the load balancing master 16 may further select one of the other load balancing slaves for serving the request or alternatively, may instruct the requesting load balancing slave 20 to service the client request. The load balancing master 16 then instructs the selected load balancing slave 18 or the requesting load balancing slave 20 to serve the request. The selected load balancing slave 20 establishes the communication link 654 between the client and the selected processing server in step 808.

Thereafter, the client request is served by the selected processing server 24 through load balancing slave 20 in step 810. Serving the client request involves a transmission of data and instructions between the client 10 and the selected processing server 24 indirectly over communication link 654 through the selected load balancing slave 20 or directly over a communication 658 between the client and the selected processing server 24.

Figure 9:
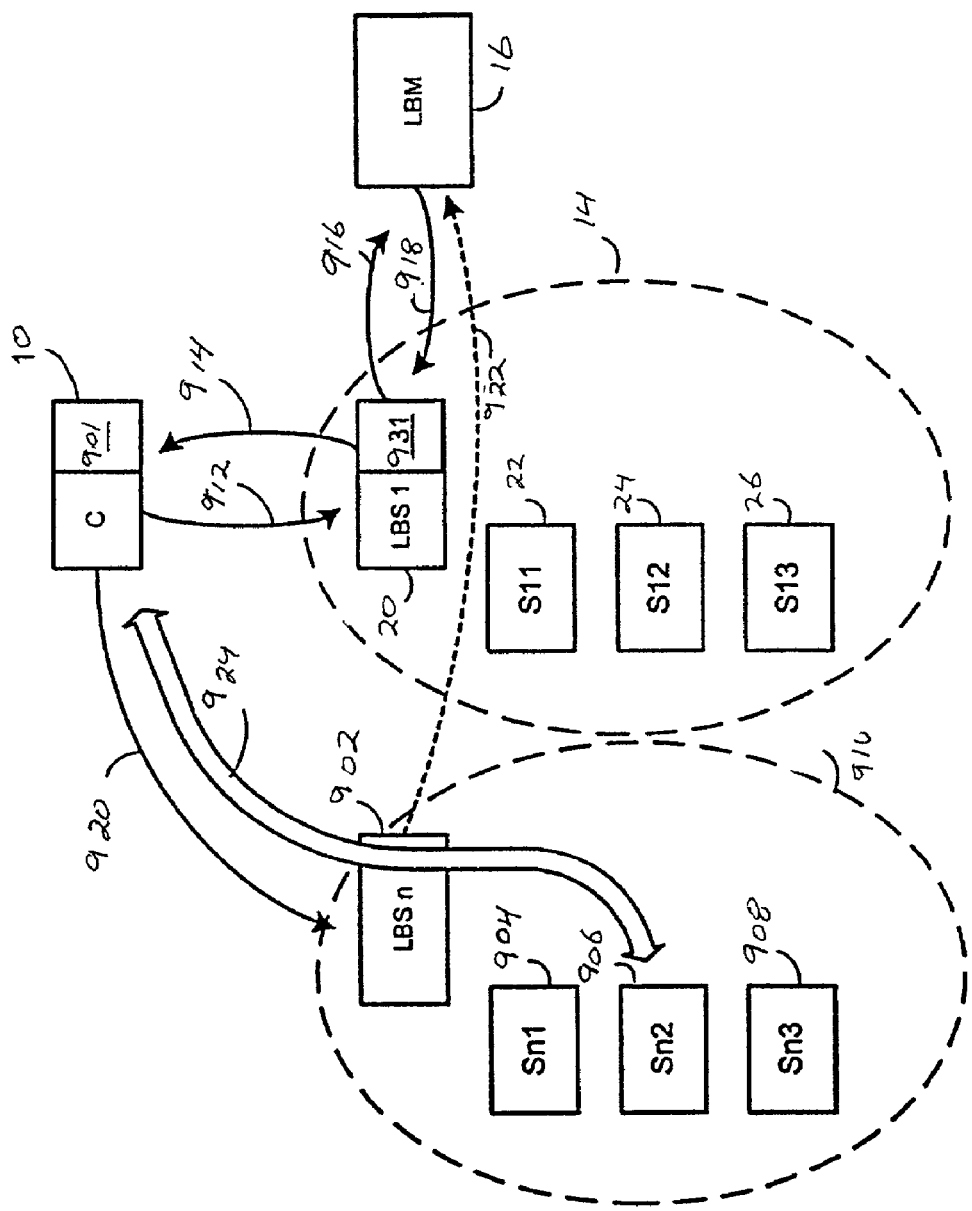
FIG. 9 depicts a block diagram illustrating a load balancing system consistent with an implementation of the present invention.

In FIG. 9, a block diagram illustrating a load balancing system is depicted. A client 10 request is transmitted to a first load balancing slave 20 in a first local area network 14 resulting in selection of a processing server 906 for serving the request accessible through another load balancing slave 902 in a second local area network 910 is illustrated. The processing servers 22, 24 and 26 may be accessible from load balancing slave 20, e.g. through a local area network 14 or they may be accessible through the load balancing slave 902, e.g. through a local area network 910. However, it is also possible that the individual processing servers are accessible through the corresponding load balancing slaves through other networks such as a wide area network like the Internet, or through dedicated communication lines including wireless transmission. Further, the selected load balancing slave 902 is not directly instructed to service the request by the load balancing master 16, instead the selected load balancing slave 20 may be instructed via the client 10 to serve the request. The client 10 may then receive an instruction message for contacting the selected load balancing slave 902 from the load balancing master 16 either directly or via the first load balancing slave 20, i.e. the load balancing slave initially requesting selection.

It is assumed that the load balancing slave 20 initially received the request from client 10 as indicated by an arrow 912, and queries the load balancing master 16 for selection, leading to the selection of load balancing slave 902 and processing server 906. The load balancing slave 20 initially receives the client request from client 10 and generates a selection request message for the load balancing master 16 as indicated by arrow 916. It is assumed that the load balancing master 16 will respond to the requesting load balancing slave and therefore the selection instruction message containing information on a selected load balancing slave and/or processing server will be returned to load balancing server 20.

The load balancing slave 20 may have a slave redirection message generator 931 for generating a redirection message for redirecting the client request to the selected load balancing slave. Further, the load balancing slave 20 transmits the redirection message to the selected load balancing slave 902. The slave redirection message generator 931 may be realized by a code section executed at the load balancing slave or a separate data processing device and may be configured to transmit the redirection message containing information on the selected load balancing slave and selected processing server to the requesting client, as indicated by arrow 914 in the present case. It is noted that in the case where the selection instruction message received from the load balancing master 16, as indicated by arrow 918, would identify the load balancing slave 20 as the selected load balancing slave, the load balancing slave 20 would directly serve the client request.

The client 10 may comprise client redirection message generator 901 for receiving a redirection message from the load balancing slave 20 and to generate a client request message to the load balancing slave 902 specified by the redirection message. Therefore, based on the redirection message containing information on the selected load balancing slave 902 and selected processing server 906, the client 10 is enabled to generate a client request for transmission to the selected load balancing slave 902 as illustrated by an arrow 920. The client request is then transmitted to the selected load balancing slave 902 and includes the additional information in the client request as outlined with respect to previous embodiments. The client request, further includes information on the selected processing server 906 in order to enable the load balancing slave 902 to establish the communication link between the client 10 and the processing server 906 through load balancing slave 902, as illustrated by a double-lined arrow 924. The client redirection message generator 901 may be realized by a code section executed at the client or a separate data processing device.

The load balancing slave 902, upon receiving the client request illustrated by arrow 920 from client 10, may generate a further selection request message for the load balancing master 16 as illustrated by an arrow 922. This allows the load balancing master 16 to reconsider the selection of load balancing slave 902 and/or processing server 906 in case the load balancing master 16 selection has changed. This change at the load balancing master 16 may involve, for example, a changed load scenario at the load balancing slaves and processing servers, previous client requests, already started program, in response to client requests from a particular client and similar. Further, the grouping of load balancing slaves and processing servers is an example and not necessarily limited to that shown in FIG. 9. For example, in other embodiments, it is possible that load balancing slave 20 can access processing servers 904, 906 and 908.

Figure 10:
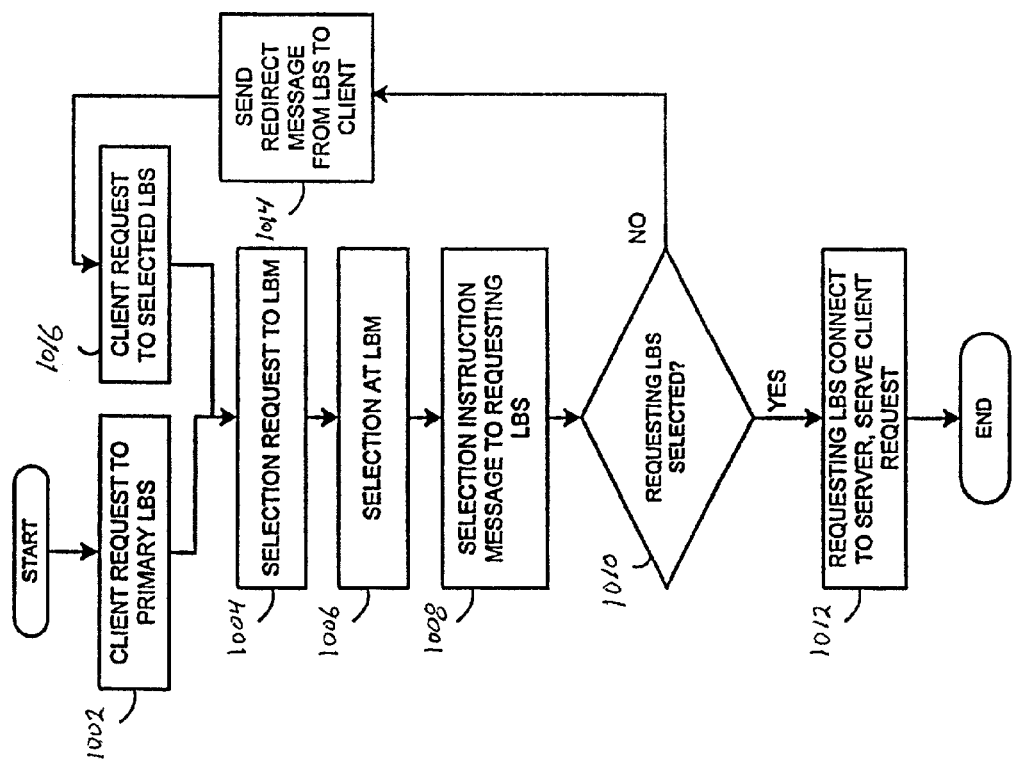
FIG. 10 depicts a flow diagram illustrating the processing steps of load balancing with a primary load balancing slave executed in accordance with a method consistent with an implementation of the present invention.

In FIG. 10, the processing steps of load balancing with a primary load balancing server is illustrated. In step 1002, a client request is transmitted to a primary load balancing slave. The primary load balancing slave may be a pre-selected load balancing slave or may be selected on a case by case bases. The pre-selection of the load balancing slave may depend on the location of the client and load balancing slave in the network and/or user preference. A selection request is transmitted from the receiving load balancing slave to the load balancing master in step 1004. The selection request message may include a request to select a processing server and/or a load balancing slave for serving the request. The load balancing master in step 1006 selects a processing server and/or a load balancing slave for serving the request. In step 1008, the load balancing master sends a selection instruction message to the requesting load balancing slave, i.e., the load balancing slave which initially received the client request and generated the selection request message.

In step 1010, the selection instruction message is detected at the requesting load balancing slave and identifies whether the requesting load balancing slave is the selected load balancing slave. In the case when the requesting load balancing slave is the selected load balancing slave, i.e. in case the decision is "YES", the requesting load balancing slave, in step 1012, connects to the selected processing server in order to establish a communication link between the client 10 and the selected processing server to service the client request. Establishing the communication link and serving the client request may for example be accomplished as outlined with respect to previous embodiments. If in step 1010 the requesting load balancing slave determines that the requesting load balancing slave is not the selected load balancing slave i.e. in case the decision is "NO", then the requesting load balancing slave, in step 1014, generates a redirect message and transmits same to the client. The redirect message may include information on the selected load balancing slave and/or information on the selected processing server. In step 1016, the client then transmits a client request to the selected load balancing slave and the flow continues with step 1004.

Figure 11:
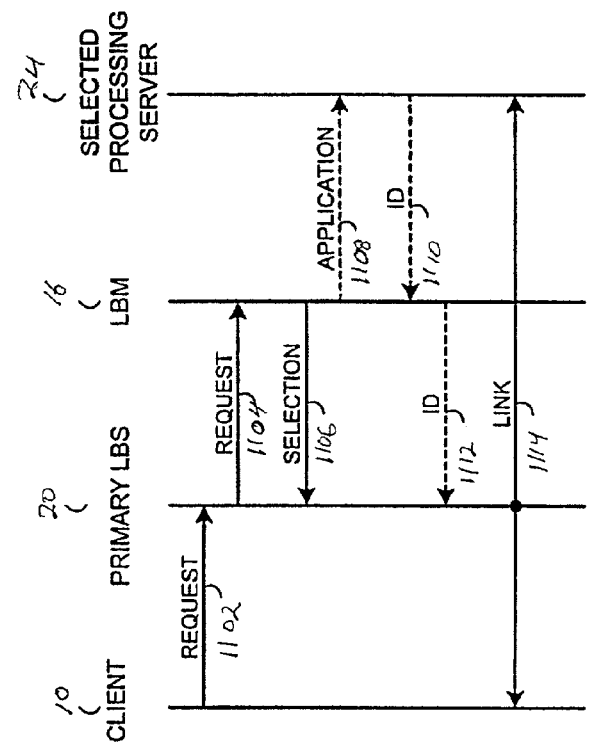
FIG. 11 depicts a time sequence of steps performed consistent with an implementation of the present invention.

In FIG. 11, a time sequence of events and messages between a client 10, a requesting load balancing slave 20, a load balancing master 16 and a selected processing server 24 are illustrated. In step 1102 the client 10 sends a client request to the primary load balancing slave 20. The primary load balancing slave 20 sends thereupon a selection request message, in step 1104, to the load balancing master 16. The load balancing master selects a suitable processing server, e.g. according to location of the client and location of the processing server, processing load at individual processing servers reported to the load balancing master from the processing servers, or based on previous requests from clients, for example a processing server which already serves a previous request of a particular client could be selected for serving the client request. Selection may also be performed as outlined with respect to previous embodiments.

In step 1106 the load balancing master sends a selection message back to the primary load balancing slave 20, including an identifier of the selected processing server. The primary load balancing slave 20 establishes a communication link between the client and the selected processing server 24 through the primary load balancing slave 20 for serving the request in a step 1114. Alternatively, after step 1106, the load balancing master, in step 1108, may send an application instruction message to the selected processing server 24, instructing the selected processing server 24 to launch a program requested in connection with the client request from client 10. This may be accomplished by contacting a daemon on the processing server 24 and instructing the daemon to launch the program.

In step 1110, the selected processing server 24 or the daemon may return an identifier of a process corresponding to the requested program to the load balancing master 16. Thereupon, the load balancing master 16 may notify the primary load balancing slave 20 of the process identification, in step 1112, in preparation of establishing the communication link between the client 10 and the selected processing server 24. Thus, the launch of a requested program occurs before a communication link to the client 10 is established. The process identification may also include information on a communication end point, i.e. a device address and a port number in addition to the process identifier. Further, steps 1108, 1110 and 1112 are optional and indicated by broken lines.

Figure 12:
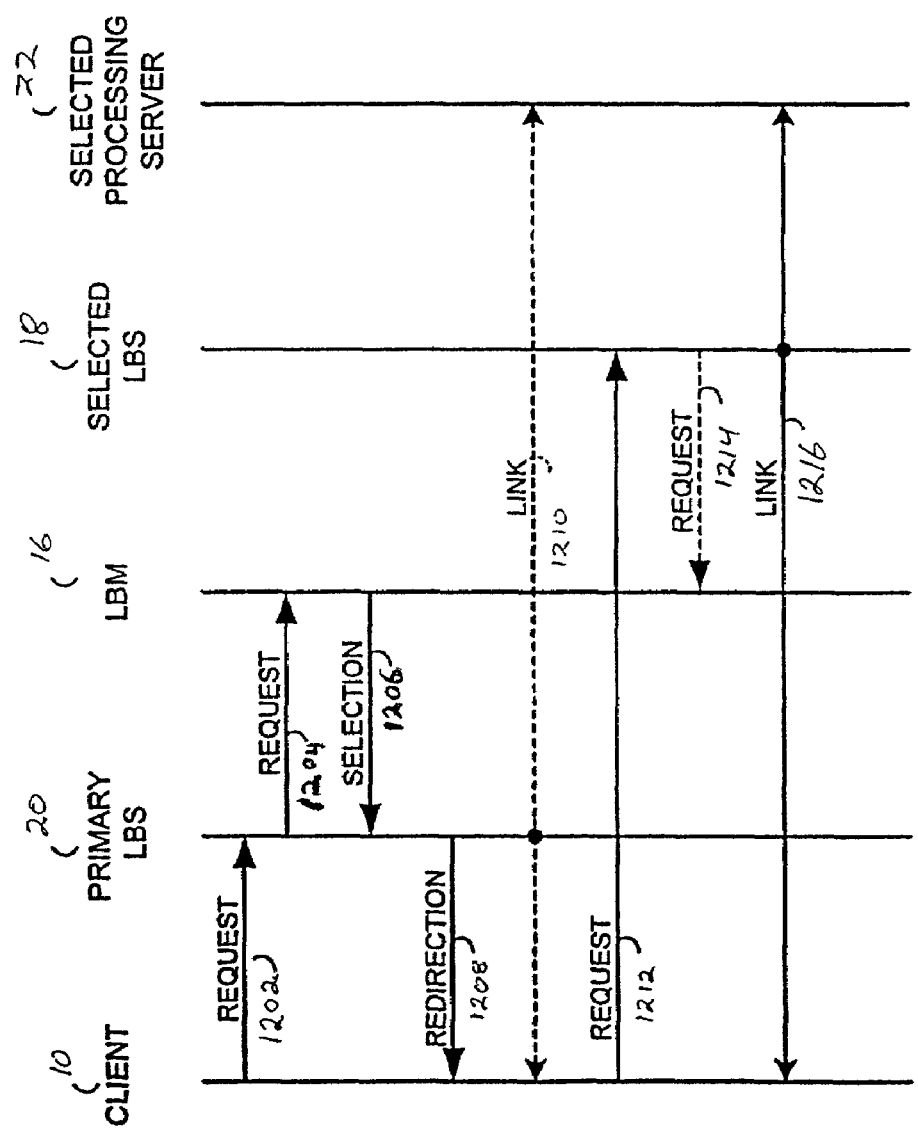
FIG. 12 depicts a time sequence of steps performed consistent with an implementation of the present invention.

In FIG. 12, a time sequence of steps performed by the client 10, a primary load balancing slave 20, a load balancing master 16, a selected load balancing slave 18 and a selected processing server 22 are depicted. It is also assumed that the load balancing master does not select the primary load balancing slave 20 for serving the request but instead selects another load balancing slave for serving the request. In step 1202, the client 10 transmits a request message to the primary load balancing slave 20. The request message may include a request for service involving a particular program to be executed on a processing server. The primary load balancing slave 20 thereupon transmits a selection request message to the load balancing master 16, in step 1204, which upon receiving the selection request message selects a processing server and a load balancing slave for serving the request. The selection of the load balancing slave and the processing server may depend on the location of the client 10, the location of the particular load balancing slaves, and the locations of available processing servers. Further, the selection may depend on a processing load at the respective load balancing slaves and processing servers, e.g. reported to the load balancing master. Further, the selection may depend on previous requests from the client, e.g. in order to group client requests for service involving one load balancing master and/or processing server. The selection may be accomplished as outlined with respect to previous embodiments.

In step 1206, the load balancing master 16 transmits a selection instruction message to the primary load balancing slave 20 containing information about selected load balancing slave and processing server. If the primary load balancing slave is not selected load balancing slave in step 1206, then the primary load balancing slave 20 transmits a redirection message in step 1208 to the client 10. The redirection message instructs the client to send a further request to the selected load balancing slave. If the load balancing master selects the primary load balancing slave, then the primary load balancing slave may directly proceed, step 1210, to establish the communication link between the client 10 and the selected processing server 22.

The client 10 analyzes the redirection message and transmits a further client request in step 1212 to the selected load balancing slave. This request contains information on the selected processing server. In step 1216, the selected load balancing slave proceeds to establish a communication link between the client 10 and the selected processing server 22. Alternatively, in step 1214, as indicated by a broken line, the selected load balancing slave may transmit a further selection request message to the load balancing master 16, e.g. for confirming the selection or for selecting another load balancing slave, in case selection fundamentals changed subsequent to the previous selection.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method for balancing a load in a network having a load balancing slave server, a load balancing master server, a plurality of processing servers, and a client, the method comprising the steps of:
   selecting by the load balancing master server the load balancing slave server to receive a processing request from the client to perform a processing;
   receiving at the load balancing slave server the processing request from the client to perform the processing, after the load balancing master server selects the load balancing slave server;
   sending by the load balancing slave server a processing server request to the load balancing master server in response to the receipt of the processing request;
   determining a load of each of the plurality of processing servers by the load balancing master server by receiving a load metric with the processing server request from the load balancing slave server at the load balancing master server;
   selecting by the load balancing master server a selected one of the plurality of processing servers that is suitable for performing the processing responsive to the processing server request, wherein the selected one of the plurality of processing servers is selected based on the load of each of the plurality of processing servers;
   sending an identifier of the selected one of the plurality of processing servers from the load balancing master server to the load balancing slave server; and
   establishing by the load balancing slave server a communication link between the selected one of the plurality of processing servers and the client to perform the processing.

2. The method of claim 1, wherein the step of establishing further includes the step of:
   routing the communication link between the selected one of the plurality of processing servers and the client through the load balancing slave server.

3. The method of claim 1, further comprising the step of: receiving a plurality of load metrics from each of the plurality of processing servers.

4. A method in a data processing system having a first and a second load balancing server and having a plurality of processing servers, the method comprising the steps of:
   selecting by the second load balancing server the first load balancing server to receive a processing request from a client to perform a processing;
   receiving by the first load balancing server the processing request to perform the processing, after the second load balancing server selects the first load balancing server;
   sending a processing server request from the first load balancing server to the second load balancing server;
   determining a load of each of the plurality of processing servers by the second load balancing server;
   selecting by the second load balancing server a selected one of the plurality of processing servers that is suitable for performing the processing responsive to the processing server request, wherein the selection is performed based on the load of each of the plurality of processing servers;
   sending an identifier of the selected one of the plurality of processing servers from the second load balancing server to the first load balancing server; and
   sending by the second load balancing server to the selected one of the plurality of processing servers an indication to perform the processing by identifying to the first load balancing server the selected one of the plurality of processing servers after the indication to perform the processing has been sent to the selected one of the plurality of processing servers.

5. The method of claim 4, further comprising the steps of:
   receiving a plurality of load metrics that originate from the plurality of processing servers at the second load balancing server.

6. The method of claim 4, wherein sending the processing server request further includes the step of:
   encoding at least one load metric in the processing server request.

7. The method of claim 4, wherein the first load balancing server is a load balancing slave.

8. The method of claim 4, wherein the second load balancing server is a load balancing master.

9. A data processing system, comprising:
   a plurality of processing servers;
   a client that sends a processing request;
   a load balancing slave server that is selected by a load balancing master server to receive the processing request from the client after the load balancing slave server is selected, that sends processing server request to the load balancing master server for a selection of one of the plurality of processing servers that is suitable for performing a processing, that receives an indication of the selected one of the plurality of processing servers from the load balancing master server, and that establishes a communication link between the selected one of the plurality of processing servers and the client to perform the processing; and the load balancing master server that selects the load balancing slave server to receive the processing request from the client after the load balancing slave server is selected, that receives a processing server request from the load balancing slave server, that determines a load of each of the plurality of processing servers, that selects the selected one of the plurality of processing servers based on the load of each of the plurality of processing servers responsive to the processing server request, and that sends the indication of the selected one of the plurality of processing servers to the load balancing slave server, wherein at least one load metric is included in the processing server request sent by the load balancing slave server to the load balancing master server.

10. The data processing system of claim 9, wherein a plurality of load metrics are received at the load balancing master server from the plurality of processing servers that indicate the load on each of the plurality of processing servers.

11. A data processing system, comprising:

a plurality of processing servers;

a client that sends a processing request to have processing performed in a load balanced manner;

a first load balancing server that is selected by a second load balancing server to receive the processing request from the client and that receives the processing request from the client after the first load balancing server is selected; and the second load balancing server that selects the first load balancing server to receive the processing request from the client, that receives a processing server request from the first load balancing server, that determines a load of each of the plurality of processing servers by receiving a load metric with the processing server request, that selects a selected one of the plurality of processing servers that is suitable for performing the processing in the load balanced manner responsive to the processing server request, and that sends to the selected one of the plurality of processing servers an indication to perform the processing, wherein the selection is based on the load of each of the plurality of processing servers.

12. The data processing system of claim 11, wherein the first load balancing server is a load balancing slave.

13. The data processing system of claim 11, wherein the second load balancing server is a load balancing master.

14. The data processing system of claim 11, wherein the second load balancing server is in receipt of a plurality of load metrics that originate from each of the plurality of processing servers and indicate the load on each of the plurality of processing servers.

15. A computer-readable medium containing instructions that cause a data processing system to perform a method for balancing a load in a network having a load balancing slave server, a load balancing master server, a plurality of processing servers, and a client, the method comprising the steps of:

selecting by the load balancing master server the load balancing slave server to receive a processing request from the client to perform a processing;

receiving at the load balancing slave server the processing request from the client to perform the processing after the load balancing master server selects the load balancing slave server;

sending by the load balancing slave server a processing server request to the load balancing master server in response to the receipt of the processing request;

determining a load of each of the plurality of processing servers by the load balancing master server by receiving a load metric with the processing server request from the load balancing slave server at the load balancing master server;

selecting by the load balancing master server a selected one of the plurality of processing servers that is suitable for performing the processing responsive to the processing server request, wherein the selected one of the plurality of processing servers is selected based on the load of each of the plurality of processing servers;

sending an identifier of the selected one of the plurality of processing servers from the load balancing master server to the load balancing slave server; and establishing by the load balancing slave server a communication link between the selected one of the plurality of processing servers and the client to perform the processing.

16. The computer-readable medium of claim 15, wherein the step of establishing further includes the step of:

routing the communication link between the selected one of the plurality of processing servers and the client through the load balancing slave server.

17. The computer readable medium of claim 15, further comprising the step of:

receiving a plurality of load metrics from each of the plurality of processing servers.

18. A computer readable medium containing instructions that cause a data processing system to perform a method for load balancing having a first and a second load balancing server and having a plurality of processing servers, the method comprising the steps of:

selecting by the second load balancing server the first load balancing server to receive a processing request from a client to perform a processing;

receiving by the first load balancing server the processing request to perform the processing, after the second load balancing server selects the first load balancing server;

sending a processing server request from the first load balancing server to the second load balancing server;

determining a load of each of the plurality of processing servers by the second load balancing server;

selecting by the second load balancing server a selected one of the plurality of processing servers that is suitable for performing the processing responsive to the processing server request, wherein the selection is performed based on the load of each of the plurality of processing servers; and sending by the second load balancing server to the selected one of the plurality of processing servers an indication to perform the processing by identifying to the first load balancing server the selected one of the plurality of processing servers after the indication to perform the processing has been sent to the selected one of the plurality of processing servers.

19. The computer-readable medium of claim 18, further comprising the steps of:

receiving a plurality of load metrics that originate from the plurality of processing servers at the second load balancing server.

20. The computer-readable medium of claim 18, wherein sending the processing server request further includes the step of:
  encoding at least one load metric in the processing server request.

21. A load balancer for balancing a load in a network having a load balancing slave server, a load balancing master server, a plurality of processing servers, and a client, the load balancer comprising:
  means for selecting by the load balancing master server the load balancing slave server to receive a processing request from a client to perform a processing;
  means for receiving at the load balancing slave server the processing request from the client to perform the processing, after the load balancing master server selects the load balancing slave server;
  means for sending by the load balancing slave server a processing server request to the load balancing master server in response to the receipt of the processing request;
  means for determining a load of each of the plurality of processing servers by the load balancing master server by receiving a load metric with the processing server request from the load balancing slave server at the load balancing master server;
  means for selecting by the load balancing master server a selected one of the plurality of processing servers that is suitable for performing the processing responsive to the processing server request, wherein the selected one of the plurality of processing servers is selected based on the load of each of the plurality of processing servers;
  means for sending an identifier of the selected one of the plurality of processing servers from the load balancing master server to the load balancing slave server; and
  means for establishing by the load balancing slave server a communication link between the selected one of the plurality of processing servers and the client to perform the processing.

* * * * *

UNITED STATES PATENT AND TRADEMARK OFFICE
CERTIFICATE OF CORRECTION

PATENT NO. : 7,500,243 B2
APPLICATION NO. : 09/932717
DATED : March 3, 2009
INVENTOR(S) : Matthias Huetsch et al.

It is certified that error appears in the above-identified patent and that said Letters Patent is hereby corrected as shown below:

On the Title page:

"(30) Foreign Application Priority Data

Aug. 17, 2000 (EP) 00117722"

should be

--(30) Foreign Application Priority Data

Aug. 17, 2000 (EP) 00117722.9--

Signed and Sealed this

Twenty-first Day of April, 2009

JOHN DOLL
*Acting Director of the United States Patent and Trademark Office*